3,026,327
SUBSTITUTED 1,3,5,7-TETRAALKYL-2,6,9-TRIOXA-10-PHOSPHATRICYCLO[3.3.1.1³,⁷]DECANES
Martin Epstein and Sheldon A. Buckler, Stamford, Conn., assignors to American Cyanamid Company, New York, N.Y., a corporation of Maine
No Drawing. Filed July 6, 1960, Ser. No. 41,028
11 Claims. (Cl. 260—340.7)

The present invention relates to novel derivatives of 1,3,5,7 - tetraalkyl - 2,6,9 - trioxa - 10 - phosphatricyclo[3·3·1·1³,⁷]decanes and methods of preparing same.

The 1,3,5,7 - tetraalkyl - 2,6,9 - trioxa - 10 - phosphatricyclo[3·3·1·1³,⁷]decane reactants used to prepare the novel derivatives contemplated herein are prepared as described in copending U.S. Application Serial No. 41,-027 filed simultaneously herewith on July 6, 1960.

According to a particular embodiment of said copending application, phosphine is reacted with 2,4-pentanedione in the presence of hydrochloric acid to yield 1,3,5,7 - tetramethyl - 2,6,9 - trioxa - 10 - phosphatricyclo[3·3·1·1³,⁷]decane as follows:

$$PH_3 + 2CH_3-\overset{O}{\overset{\|}{C}}CH_2\overset{O}{\overset{\|}{C}}-CH_3 \longrightarrow$$

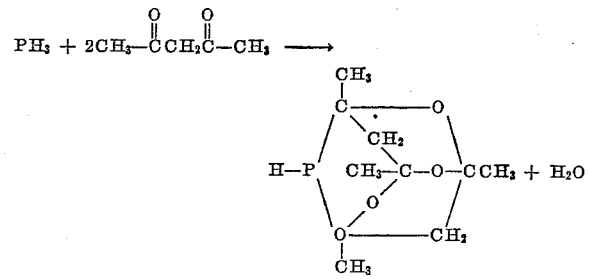

According to still another embodiment of the copending application a primary phosphine, such as isobutylphosphine, is reacted with an alkyl-β-diketone, such as 3,5-heptanedione, in the presence of methanesulfonic acid to yield 1,3,5,7-tetraethyl-10-isobutyl-2,6,9-trioxa-10-phosphatricyclo[3·3·1·1³,⁷]decane

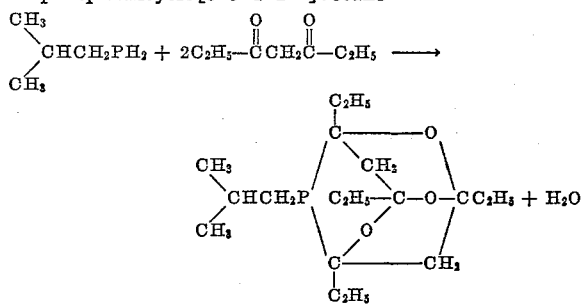

Generically, the reactants are represented by the following formula

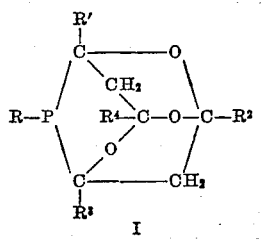

I wherein R is H or the residue of a primary phosphine; R' is a member selected from the group consisting of $CF_3$ and lower alkyl; $R^2$, $R^3$ and $R^4$, respectively, likewise each represent a member selected from the group consisting of $CF_3$ and lower alkyl.

As indicated by the equations given above, the R moiety in the general formula just given is derived from phosphine or a primary phosphine ($RPH_2$) reactant.

Typical primary phosphine reactants useful for preparing compounds of the general formula given above are phenylphosphine, methylphosphine, ethylphosphine, butylphosphine, octylphosphine, cyclohexylphosphine, dodecylphosphine, isopropylphosphine, allylphosphine, 2-hydroxyethylphosphine, benzylphosphine, para-chlorophenylphosphine, isobutylphosphine, 2-carboethoxyethylphosphine, 2-cyanoethylphosphine, and the like. It follows from the above listing that typical substituents are those which do not enter into the reaction, which are inert under the conditions of the reaction, such as nitrile, lower alkoxy, halogen, hydroxy, carboalkoxy (lower), and the like.

Typical β-diketones useful for preparing the reactants of the present invention pursuant to copending application Serial No. 41,027, are hexafluoro-substituted pentanediones, such as 1,1,1,5,5,5 - hexafluoro - 2,4-pentanedione, 2,4-pentanedione, 3,5-heptanedione, 2,4-hexanedione, 4,6-nonanedione, 5,7-undecanedione, and other like alkyl ($C_5$—$C_{11}$)—β-diketones.

The β-diketones and phosphines are brought together at a temperature in the range of —20°C. to 200° C., preferably 15° C. to 80° C.

Stoichiometric amounts of the reactants are generally employed, e.g., one molar equivalent of the phosphine or primary phosphine reacts with two molar equivalents of the alkyl-β-diketone reactant to produce the corresponding decane product.

The reactants are best brought together in the presence of a mineral acid, such as HCl, $H_2SO_4$, HBr, $H_3PO_4$, $HNO_3$, HI, or the like. Inert organic acids may be employed, such as methanesulfonic acid, benzenesulfonic acid, benzenephosphonic acid, or the like.

By the same token, the reactions may be carried out in an aqueous medium; an alcohol medium, such as that of ethyl alcohol, methyl alcohol; an ether medium, such as that of diethylether, dioxane, tetrahydrofuran; a hydrocarbon medium, such as that of benzene, xylene, toluene, hexane; an acetone medium; and the like. As is evident, numerous inert organic solvents may be employed. By inert is meant that the solvents under the conditions of the reaction do not react to any substantial degree with the reactants and their products, and in addition are inert with respect to the strong inorganic and organic acids employed in the reaction.

Several typical reactions demonstrating the preparation of the reactants contemplated herein are given in the alphabetical series of examples, infra.

The novel products of the present invention are derived, as will be seen hereinafter, from the reactants represented by the generic Formula I, above. These products have the general formula

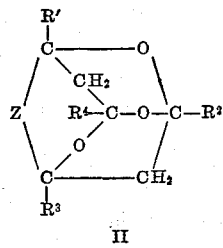

II wherein R'—R⁴ are the same as in reactant formula I, above, and Z represents

i.e., the acids and thio-acids, in which Q is O or S and Ra is H, and lower alkyl, and alkali salts, such as Na, Li, K, NH₄, alkaline earth metal salts, heavy metal salts, such as Fe, Pb, Ag, Hg, Al, and the like;

wherein Q is O or S and Rb is halogen, hydrogen, or the residue of a primary phosphine, i.e., the same as R as in the reactant formula;

wherein Rc is

and substituted carbamoyl,

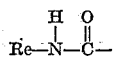

in which Rd is selected from the group consisting of phenyl, halo-substituted phenyl and lower alkyl-substituted phenyl and Re is taken from the group consisting of lower alkyl, substituted alkyl, phenyl, substituted phenyl, one of said substituents on the phenyl and alkyl moieties being

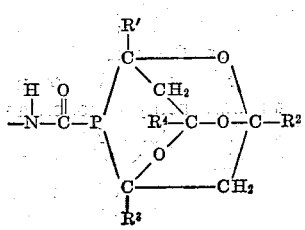

R'—R⁴ having the meanings given above, and other substituents for the phenyl moiety being selected from the group consisting of halo-, nitro-, and lower alkyl;

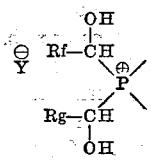

wherein Rf and Rg, respectively, represent H or lower alkyl and Y is the anion of a mineral acid; and

wherein Rh and Ri, respectively, represent lower alkyl and X is halide.

The acids derived from reactant I, above, are produced by the oxidation of the secondary phosphine reactant HP<I with an organic or inorganic oxidizing agent, such as H₂O₂, ozone, sodium hypochlorite, t-butylhydroperoxide, and the like. The reaction is generally carried out at a temperature in the range of −80° C. to 250° C., or greater, in the presence of a suitable inert solvent, such as H₂O, an ether, an alcohol, a hydrocarbon, e.g., benzene, or the like. Sufficient oxidizing agent is employed to add 2 atoms of oxygen to the secondary phosphine reactant I.

The thio- acids are prepared by bringing the secondary phosphine reactant I into contact with elemental sulfur, in one of its various forms, as the oxidizing agent. Reaction is generally made to take place in the presence of an inert solvent, such as a hydrocarbon, an ether, or the like. As in the case of the oxo- acids sufficient sulfur is used to provide at least 2 atoms of sulfur per mole of secondary phosphine reactant I.

The salts of these oxo- and thio- acids are readily prepared by the addition thereto of the corresponding alkali, such as NaOH, KOH, NH₄OH, Pb(OH)₂, etc. In other words, the acids are neutralized with the appropriate alkali reactant.

If desired, the neutral salts may be prepared in situ, i.e., in a one-step process, by combining the secondary phosphine reactant I with the appropriate oxidizing agent and alkali and recovering the corresponding salt.

The isocyanate derivatives of the secondary phosphine reactants I contemplated herein are prepared by bringing together an organic isocyanate of diisocyanate and the appropriate secondary phosphine reactant I in the presence of a basic catalyst, such as a tertiary amine. The reactants are brought together at a temperature in the range of 0° C. to 150° C. Suitable inert organic solvents are aromatic hydrocarbons, aliphatic hydrocarbons, ethers, and the like.

The

derivatives of the present invention are prepared by reacting by reacting at least 1 equivalent of benzaldehyde or a substituted benzaldehyde with a secondary phosphine reactant I in the presence of an acid catalyst, such as a mineral acid or a strong organic acid, at a temperature in the range of 0° C. to 150° C. Generally, an inert solvent, such as an alcohol, an ether, a hydrocarbon, or the like, is employed.

The $$Rd-P\overset{Q}{\underset{\diagdown}{\parallel}}$$

products, i.e., the phosphine oxides and sulfides, contemplated herein in which Rb is hydrogen are prepared by the controlled oxidation of the corresponding secondary phosphine reactant I. When oxygen, H₂O₂, or an organic peroxide, such as t-butylhydroperoxide, is employed the oxide product results. When elemental sulfur is the oxidizing agent, Q is S. These phosphine oxide derivatives require equimolar amounts of the secondary phosphine reactant I and oxidizing agent and temperatures usually in the range of 0° C. to 100° C. Suitable inert solvents for this reaction are alcohols, ethers, hydrocarbons, or the like.

In the case where Rb is the residue of a primary phosphine, the corresponding tertiary phosphine reactant I is employed under the same conditions, with the exception that more than 1 molar equivalent of oxidizing agent per molar equivalent of tertiary phosphine reactant I may be employed.

When Rb is halogen and Q is oxygen, these products are prepared by bringing together the corresponding oxo-acid (prepared as described hereinabove) and thionyl chloride at a temperature in the range of 0° C. to 150° C. in the presence of an inert solvent, such as an ether, a hydrocarbon, or the like.

To prepare the thio-analog the reaction is carried out in the same manner with the exception that the secondary dithio-acid reactant is employed and thionyl chloride is substituted with sulfuryl chloride.

The

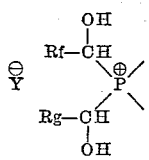

derivative compounds are prepared by reacting a secondary phosphine reactant I with at least 2 molar equivalents of a lower alkyl aldehyde in the presence of an acidic catalyst, such as a strong mineral acid or strong organic acid. The reaction is generally made to take place at a temperature in the range of 0° C. to 150° C. and usually in the presence of an inert solvent, such as an alcohol, an ether, a hydrocarbon, or the like.

The

derivatives are prepared by bringing together into reactive contact a secondary or tertiary phosphine reactant I with a lower alkyl halide at a temperature in the range of 0° C. to 200° C. and, preferably, in the presence of an inert solvent, such as an alcohol, an ether, a hydrocarbon, or the like.

By inert solvent hereinabove is intended a solvent which under the conditions of the reaction does not react to any substantial degree with the reactants or their reaction products.

The novel 1,3,5,7-tetraalkyl-2,6,9-trioxa-10-phosphatriclo [3·3·1·1$^{3,7}$] decane derivatives of the present invention have utility as gasoline additives. For example, up to about 10 milliliters of any one of these derivatives, when dissolved in one gallon of gasoline, affords protection against misfiring, surface ignition, and the like.

The process for preparing the novel and useful derivatives of the instant discovery will best be understood from the following examples:

EXAMPLE I

*1,3,5,7-Tetramethyl-2,6,9-Trioxa-10-Phosphatricyclo[3·3·1·1$^{3,7}$]Decane-10-Inoic Acid*

To a solution of 6.4 grams of 1,3,5,7-tetramethyl-2,6,9-trioxa-10-phosphatricyclo[3·3·1·1$^{3,7}$]decane (0.03 mole) in 25 milliliters of methanol is added 9.3 grams of 30 percent hydrogen peroxide (0.08 mole) and the resulting solution refluxed for ½ hour. The methanol is evaporated to give 6.0 grams of 1,3,5,7-tetramethyl-2,6,9-trioxa-10-phosphatricyclo[3·3·1·1$^{3,7}$]decane-10-inoic acid as a crystalline solid (81 percent yield). An analytical sample is prepared by recrystallization from isopropanol, melting point 222° C.

Analysis calculated for $C_{10}H_{17}O_5P$: C, 48.39; H, 6.90; P, 12.48; molecular weight, 248. Found: C, 48.53; H, 6.91; P, 12.43; molecular weight, 254.

EXAMPLE II

*1,3,5,7,10,10-Hexamethyl-2,6,9-Trioxa-10-Phosphonia-Tricyclo[3·3·1·1$^{3,7}$]Decane Iodide*

A solution of 2.1 grams of 1,3,5,7-tetramethyl-2,6,9-trioxa-10-phosphatricyclo[3·3·1·1$^{3,7}$]decane (0.01 mole) dissolved in 30 milliliters of methyliodide is refluxed for 18 hours. A solid precipitates and is collected and recrystallized from acetone to yield 1.8 grams of 1,3,5,7,10,10-hexamethyl-2,6,9-trioxa-10-phosphonia - tricyclo[3·3·1·1$^{3,7}$]decane iodide (48 percent yield). An analytical sample is prepared by recrystallization from isopropanol, melting point 243° C.–244° C.

Analysis calculated for $C_{12}H_{22}O_3PI$: C, 38.72; H, 5.96; P, 8.32; I, 34.10. Found: C, 38.57; H, 5.95; P, 8.04; I, 34.07.

EXAMPLE III

*1,3,5,7-Tetramethyl-10,10-Dibutyl-2,6,9-Trioxa-10-Phosphoniatricyclo[3·3·1·1$^{3,7}$]Decane Iodide*

A solution of 5.3 grams of 1,3,5,7-tetramethyl-2,6,9-trioxa - 10 - phosphatricyclo[3·3·1·1$^{3,7}$]decane (0.025 mole) dissolved in 30 milliliters of butyliodide is heated to 65° C. for 24 hours. A solid separates which is collected and recrystallized from tetrahydrofuran to yield an analytical sample of 1,3,5,7-tetramethyl-10,10-dibutyl-2,6,9 - trioxa-10-phosphoniatricyclo[3·3·1·1$^{3,7}$]decane iodide, melting point 209° C.–211° C.

Analysis calculated for $C_{18}H_{34}O_3IP$: C, 47.37; H, 7.51; P, 6.79; I, 27.81. Found: C, 47.77; H, 7.97; P, 6.58; I, 27.41.

EXAMPLE IV

*1,3,5,7 - Tetramethyl - 10,10 - Dihydroxymethyl - 2,6,9-Trioxa - 10 - Phosphoniatricyclo [3·3·1·1$^{3,7}$] Decane Chloride*

A solution of 6.0 grams of 1,3,5,7-tetramethyl-2,6,9-trioxa-10 - phosphatricyclo[3·3·1·1$^{3,7}$] decane (0.027 mole), 4.9 grams of 37 percent formaldehyde (0.06 mole), 50 milliliters of methanol and 6 milliliters of concentrated hydrochloric acid is allowed to stand for 3 days under a nitrogen atmosphere. The solvent is evaporated and the residue triturated with acetone to precipitate 5.2 grams of a white solid, melting point 161° C.–162° C. A pure sample of 1,3,5,7-tetramethyl-10,10 - dihydroxymethyl - 2,6,9 - trioxa - 10 - phosphoniatricyclo [3·3·1·1$^{3,7}$]decane chloride (61 percent yield) is obtained by recrystallization from acetone, melting point 161°–162° C.

Analysis calculated for $C_{12}H_{22}O_5PCl$: C, 46.08; H, 7.09; P, 9.91; Cl, 11.34. Found: C, 45.79; H, 7.20; P, 10.01; Cl, 11.39.

EXAMPLE V

*1,3,5,7-Tetramethyl-10-Phenylcarbamoyl-2,6,9-Trioxa-10-Phosphatricyclo[3·3·1·1$^{3,7}$]Decane*

A solution of 4.0 grams of 1,3,5,7-Tetramethyl-2,6,9-trioxa - 10 - phosphatricyclo[3·3·1·1$^{3,7}$] decane (0.019 mole), 2.3 grams of phenylisocyanate (0.02 mole), 50 milliliters of benzene and 0.5 gram of triethylenediamine is allowed to stand for 24 hours under a nitrogen atmosphere. The solvent is evaporated and the residue recrystallized from n-hexane to yield 3.7 grams of 1,3,5,7-tetramethyl - 10 - phenylcarbamoyl - 2,6,9 - trioxa - 10-phosphatricyclo[3·3·1·1$^{3,7}$]decane (58 percent yield), melting point 98° C.–102° C. An analytical sample is recrystallized from n-hexane, melting point, 108° C.–109° C.

Analysis calculated for $C_{17}H_{22}O_4PN$: C, 60.89; H, 6.61; P, 9.24; N, 4.18. Found: C, 60.49; H, 6.91; P, 9.17; N, 4.25.

EXAMPLE VI

*N,N' - (4-Methyl-m-Phenylene)-bis(1,3,5,7 - Tetramethyl-10 - Carboxamide - 2,6,9 - Trioxa - 10 - Phosphatricyclo [3·3·1·1$^{3,7}$]Decane)*

A solution of 11.0 grams of 1,3,5,7-tetramethyl-2,6,9-trioxa - 10 - phosphatricyclo[3·3·1·1$^{3,7}$] decane (0.051 mole), 4.4 grams of toluene-2,4-diisocyanate (0.025 mole), 20 milliliters of benzene and 0.2 gram of triethylenediamine is allowed to stand for 3 days under a nitrogen atmosphere. The solid (9.0 grams) that precipitates is collected and identified as N,N'-(4-methyl-m-phenylene) - bis(1,3,5,7 - tetramethyl - 10 - carboxamide-2,6,9 - trioxa - 10 - phosphatricyclo[3·3·1·1$^{3,7}$] decane) (59 percent yield), melting point, 208° C.–211° C. An analytical sample is recrystallized from acetonitrile, melting point 217° C–219° C.

Analysis calculated for $C_{29}H_{40}O_8P_2N_2$: C, 57.42; H, 6.65; P, 10.21; N, 4.62. Found: C, 57.41; H, 6.81; P, 10.13; N, 4.75.

EXAMPLE VII

*1,3,5,7 - Tetramethyl - 2,6,9 - Trioxa-10-Phosphatricyclo [3·3·1·1$^{3,7}$]Decane-10-Dithioinoic Acid, Ammonium Salt*

A solution of 4.0 grams of 1,3,5,7-tetramethyl-2,6,9-trioxa - 10 - phosphatricyclo[3·3·1·1$^{3,7}$] decane (0.019 mole), 1.2 grams of sulfur (0.038 mole), 18 milliliters of ammonium hydroxide, 18 milliliters of water and 25 milliliters of methanol is refluxed for three hours. The mixture is filtered and evaporated at reduced pressure to leave a gummy white solid. The solid is triturated with ethyl acetate to yield 4.6 grams of 1,3,5,7-tetramethyl - 2,6,9 - trioxa - 10 - phosphatricyclo[3·3·1·1$^{3,7}$] decane-10-dithioinoic acid, ammonium salt in 84 percent yield. An analytical sample is recrystallized from ethanol and acetonitrile, melting point 217° C.–218° C.

Analysis calculated for $C_{10}H_{20}NO_3S_2P$: C, 40.39; H, 6.78; N, 4.71; S, 21.57; P, 10.42. Found: C, 39.66; H, 6.88; N, 4.62; S, 21.43; P, 10.33.

EXAMPLE VIII

*1,3,5,7-Tetramethyl-10-Isobutyl-2,6,9-Trioxa-10-Phosphatricyclo[3·3·1·1$^{3,7}$]Decane-10-Oxide*

To 2.0 grams of 1,3,5,7-tetramethyl-10-isobutyl-2,6,9-trioxa - 10 - phosphatricyclo[3·3·1·1$^{3,7}$] decane (0.007 mole) dissolved in 20 milliliters of methanol is added 1.0 gram of 30 percent hydrogen peroxide (0.01 mole). After standing for three days the solvent is evaporated to leave a white solid which is recrystallized from n-hexane to obtain an analytical sample of 1,3,5,7-tetramethyl-10-isobutyl-2,6,9-trioxa - 10 - phosphatricyclo[3·3·1·1$^{3,7}$] decane-10-oxide, melting point, 110° C.–111°C.

Analysis calculated for $C_{14}H_{25}O_4P$: C, 58.32; H, 8.74; P, 10.75. Found: C, 57.91; H, 8.79; P, 10.70.

EXAMPLE IX

*1,3,5,7,10-Pentamethyl-10-Isobutyl-2,6,9-Trioxa-10-Phosphoniatricyclo[3·3·1·1$^{3,7}$]Decane Iodide*

A solution of 1.6 grams of 1,3,5,7-tetramethyl-10-isobutyl - 2,6,9 - trioxa - 10 - phosphatricyclo[3·3·1·1$^{3,7}$] decane (0.006 mole) and 10 milliliters of methyliodide is allowed to stand for 3 days. A solid precipitates and it is collected and recrystallized from acetone to yield an analytical sample of 1,3,5,7,10-pentamethyl-10-isobutyl - 2,6,9 - trioxa - 10 - phosphoniatricyclo[3·3·1·1$^{3,7}$] decane iodide, melting point 202° C.–203° C.

Analysis calculated for $C_{15}H_{28}O_3IP$: C, 43.49; H, 6.81; I, 30.64; P, 7.48. Found: C, 43.65; H, 6.58; I, 30.81; P, 7.27.

EXAMPLE X

*1,3,5,7-Tetramethyl-10-α-Hydroxybenzyl-2,6,9-Trioxa-10-Phosphatricyclo[3·3·1·1$^{3,7}$]Decane*

A solution of 4.5 grams of 1,3,5,7-tetramethyl-2,6,9-trioxa-10-phosphatricyclo[3·3·1·1$^{3,7}$]decane (0.02 mole), 55 milliliters of methanol, 3 milliliters of concentrated HCl and 4.5 grams of benzaldehyde (0.053 mole) is allowed to stand at room temperature for 2 hours, during which time a solid precipitates. 6.4 grams of 1,3,5,7-tetramethyl - 10 - α - hydroxybenzyl - 2,6,9 - trioxa - 10-phosphatricyclo[3·3·1·1$^{3,7}$]decane is collected, melting point 128° C.–132° C. An analytical sample is prepared by recrystallization from methanol-water, melting point 135° C.–138° C.

Analysis calculated for $C_{17}H_{23}O_4P$: C, 63.34; H, 7.19; P, 9.61. Found: C, 63.64; H, 7.48; P, 9.30.

EXAMPLE XI

*1,3,5,7-Tetramethyl-2,6,9-Trioxa-10-Phosphatricyclo-[3·3·1·1$^{3,7}$]Decane-10-Sulfide*

A solution of 5.0 grams of 1,3,5,7-tetramethyl-2,6,9-trioxa - 10 - phosphatricyclo[3·3·1·1$^{3,7}$]decane (0.023 mole), 0.74 gram of sulfur (0.023 mole) and 50 milliliters of benzene is refluxed for 2 hours. The solvent is evaporated at reduced pressure to leave a residue of 1,3,5,7-tetramethyl - 2,6,9-trioxa-10-phosphatricyclo[3·3·1·1$^{3,7}$]-decane-10-sulfide.

EXAMPLE XII

*1,3,5,7-Tetramethyl-2,6,9-trioxa-10-Phosphatricyclo-[3·3·1·1$^{3,7}$]Decane-10-Dithioinoic Acid*

A solution of 6.0 grams of 1,3,5,7-tetramethyl-2,6,9-trioxa-10-phosphatricyclo[3·3·1·1$^{3,7}$] (0.027 mole), 1.73 grams of sulfur (0.054 mole) and 75 milliliters of benzene is refluxed for 5 hours. The solvent is evaporated. The residue is 1,3,5,7-tetramethyl-2,6,9-trioxa-10-phosphatricyclo[3·3·1·1$^{3,7}$]decane-10-dithioinoic acid.

EXAMPLE XIII

*1,3,5,7-Tetramethyl-2,6,9-Trioxa-10-Phosphatricyclo-[3·3·1·1$^{3,7}$]Decane-10-Oxide*

To a solution of 6.4 grams of 1,3,5,7-tetramethyl-2,6,9-trioxa-10-phosphatricyclo[3·3·1·1$^{3,7}$]decane (0.03 mole) dissolved in 50 milliliters of methanol is added 3.4 grams of 30 percent hydrogen peroxide (0.03 mole) and the resulting solution allowed to stand for one hour. The solvent is evaporated to leave a residue of 1,3,5,7-tetramethyl - 2,6,9 - trioxa - 10 - phosphatricyclo[3·3·1·1$^{3,7}$]-decane-10-oxide which is recrystallized from n-heptane, melting point 172° C.–175° C.

EXAMPLE XIV

*1,3,5,7-Tetramethyl-10-Chloro-2,6,9-Trioxa-10-Phosphatricyclo[3·3·1·1$^{3,7}$]Decane-10-Oxide*

To a solution of 5.0 grams of 1,3,5,7-tetramethyl-2,6,9-trioxa-10-phosphatricyclo[3·3·1·1$^{3,7}$]decane-10-inoic acid (0.02 mole, product from Example I) dissolved in 50 milliliters of benzene is added 4.8 grams of thionyl chloride (0.04 mole). The solution is refluxed for 6 hours and the solvent evaporated to leave a residue of 1,3,5,7-tetramethyl - 10 - chloro - 2,6,9 - trioxa - 10 - phosphatricyclo[3·3·1·1$^{3,7}$]decane-10-oxide.

EXAMPLE XV

*1,3,5,7-Tetramethyl-10-Chloro-2,6,9-Trioxa-10-Phosphatricyclo[3·3·1·1$^{3,7}$]Decane-10-Sulfide*

A solution of 4.2 grams of 1,3,5,7-tetramethyl-2,6,9-trioxa - 10 - phosphatricyclo[3·3·1·1$^{3,7}$]decane - 10 - dithioinoic acid (0.015 mole, product from Example XII), 4.1 grams of sulfuryl chloride (0.03 mole) and 50 milliliters of benzene is refluxed for 3 hours. The mixture is filtered to remove the sulfur and the filtrate evaporated to yield the product, 1,3,5,7-tetramethyl-10-chloro-2,6,9-trioxa-10-phosphatricyclo[3·3·1·1³,⁷]decane-10-sulfide.

EXAMPLE XVI

*1,3,5,7-Tetramethyl-2,6,9-Trioxa-10-Phosphatricyclo-[3·3·1·1³,⁷]Decane-10-Inoic Acid, Ethyl Ester*

A solution of 6.1 grams of 1,3,5,7-tetramethyl-10-chloro-2,6,9-trioxa-10-phosphatricyclo[3·3·1·1³,⁷]decane-10-oxide (0.023 mole, product from Example XIV), 2.1 grams of anhydrous ethanol (0.046 mole), 1.9 grams of pyridine (0.024 mole) and 50 milliliters of hexane is refluxed for 3 hours. The mixture is filtered to remove the pyridine hydrochloride and the solvent evaporated to yield the product 1,3,5,7-tetramethyl-2,6,9-trioxa-10-phosphatricyclo[3·3·1·1³,⁷]decane-10-inoic acid, ethyl ester.

EXAMPLE XVII

*1,3,5,7-Tetramethyl-2,6,9-Trioxa-10-Phosphatricyclo-[3·3·1·1³,⁷]Decane-10-Inoic Acid, Sodium Salt*

To a solution of 2.48 grams of 1,3,5,7-tetramethyl-2,6,9-trioxa-10-phosphatricyclo[3·3·1·1³,⁷]decane-10-inoic acid (Example I) in 25 milliliters of water is added 0.4 gram of sodium hydroxide. The solution is evaporated to dryness to give the white solid product, 1,3,5,7-tetramethyl-2,6,9-trioxa-10-phosphatricyclo[3·3·1·1³,⁷]decane-10-inoic acid, sodium salt.

EXAMPLE XVIII

*1,3,5,7 - Tetra(Trifluoromethyl) - 2,6,9 - Trioxa-10-Phosphatricyclo[3·3·1·1³,⁷]Decane-10-Inoic Acid, Magnesium Salt*

The procedure of Example XVII is repeated in every essential respect, except that 0.3 gram of magnesium hydroxide is used in place of sodium hydroxide. The product is 1,3,5,7-tetra(trifluoromethyl)-2,6,9-trioxa-10-phosphatricyclo[3·3·1·1³,⁷]decane-10-inoic acid, magnesium salt.

EXAMPLE XIX

*1,3,5,7 - Tetramethyl - 2,6,9 - Trioxa - 10 - Phosphatricyclo[3·3·1·1³,⁷]Decane-10-Dithioinoic Acid, Silver Salt*

A solution of 3.0 grams of 1,3,5,7-tetramethyl-2,6,9-trioxa-10-phosphatricyclo[3·3·1·1³,⁷]decane-10-dithioinoic acid, ammonium salt (0.01 mole, product from Example VII) is dissolved in 25 milliliters of water and 3.4 grams of silver nitrate (0.02 mole) is added. After standing for 24 hours the product 1,3,5,7-tetramethyl-2,6,9-trioxa-10-phosphatricyclo[3·3·1·1³,⁷]decane-10-dithioinoic acid, silver salt is obtained by filtration.

EXAMPLE XX

*1,3,5,7 - Tetraethyl - 2,4,9 - Trioxa - 10 - phosphatricyclo-[3·3·1·1³,⁷]Decane-10-Inoic Acid, Butyl Ester*

The procedure of Example XVI is repeated in every essential respect using 7.4 grams of 1,3,5,7-tetraethyl-10-chloro - 2,6,9 - trioxa - 10 - phosphatricyclo[3·3·1·1³,⁷]decane-10-oxide and 3.4 grams of anhydrous n-butanol. The product is 1,3,5,7-tetraethyl-2,4,9-trioxa-10-phosphatricyclo[3·3·1·1³,⁷]decane-10-inoic acid, butyl ester.

EXAMPLE XXI

*1,3,5,7 - Tetrabutyl - 10 - Phenyl - 2,6,9 - Trioxa - 10-Phosphatricyclo[3·3·1·1³,⁷]Decane-10-Sulfide*

A solution of 4.6 grams of 1,3,5,7-tetrabutyl-10-phenyl-2,6,9 - trioxa - 10 - phosphatricyclo[3·3·1·1³,⁷]decane (0.01 mole), 3.2 grams of sulfur (0.01 mole) and 50 milliliters of benzene is refluxed for 4 hours. The solvent is evaporated to yield a residue of 1,3,5,7-tetrabutyl-10 - phenyl - 2,6,9-trioxa-10-phosphatricyclo[3·3·1·1³,⁷]decane-10-sulfide.

EXAMPLE XXII

*1,3,5,7 - Tetramethyl - 10 - Chloro - 2,6,9 - Trioxa - 10-Phosphatricyclo[3·3·1·1³,⁷]Decane*

To a solution of 4.3 grams of 1,3,5,7-tetramethyl-2,6,9-trioxa-10-phosphatricyclo[3·3·1·1³,⁷]decane (0.02 mole) dissolved in 40 milliliters of methylene chloride at 0° C., is added 2.0 grams of phosgene (0.02 mole) and the solution allowed to stand for 24 hours. The solvent is evaporated to leave the product 1,3,5,7-tetramethyl-10-chloro-2,6,9-trioxa-10-phosphatricyclo[3·3·1·1³,⁷]decane.

EXAMPLES XXIII–XXXV

The following Tables I, II and III are self-explanatory and they further illustrate the present invention:

TABLE I

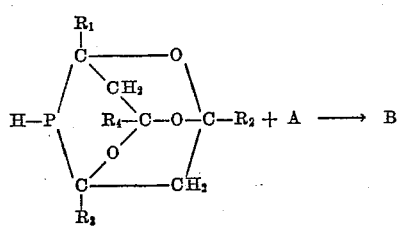

| Example | $R_1$ | $R_2$ | $R_3$ | $R_4$ | A | Solvent | Time (Hours) | Temp. °C. | Procedure of— | B |
|---|---|---|---|---|---|---|---|---|---|---|
| XXIII | $CH_3$ | $CH_3$ | $CH_3$ | $CH_3$ | p-nitrophenyl isocyanate. | toluene | 4 | 80 | Example V | 1,3,5,7-tetramethyl-10-(p-nitrophenylcarbamoyl)-2,6,9-trioxa-10-phosphatricyclo[3·3·1·1³,⁷]decane. |
| XXIV | $CF_3$ | $CF_3$ | $CH_3$ | $CH_3$ | n-butylisocyanate. | benzene | 24 | 30 | Example V | 1,3-dimethyl-5,7-di-trifluoromethyl-10-butylcarbamoyl-2,6,9-trioxa-10-phosphatricyclo[3·3·1·1³,⁷]decane. |
| XXV | $C_2H_5$ | $C_2H_5$ | $C_2H_5$ | $C_2H_5$ | m-chlorophenyl isocyanate. | xylene | 6 | 100 | Example V | 1,3,5,7-tetraethyl-10-(m-chlorophenylcarbamoyl)-2,6,9-trioxa-10-phosphatricyclo[3·3·1·1³,⁷]decane. |
| XXVI | $CH_3$ | $CH_3$ | $CH_3$ | $CH_3$ | hexamethylene diisocyanate. | benzene | 10 | 50 | Example VI | N,N'-hexamethylene-bis(1,3,5,7-tetramethyl-10-carboxamide-2,6,9-trioxa-10-phosphatricyclo[3·3·1·1³,⁷]decane). |
| XXVII | $C_4H_9$ | $C_4H_9$ | $C_4H_9$ | $C_4H_9$ | p-chlorobenzaldehyde. | tetrahydrofuran. | 6 | 40 | Example X | 1,3,5,7-tetrabutyl-10-(α-hydroxy-p-chlorobenzyl)-2,6,9-trioxa-10-phosphatricyclo[3·3·1·1³,⁷]decane. |
| XXVIII | $CF_3$ | $CF_3$ | $CF_3$ | $CF_3$ | p-tolualdehyde. | ethanol | 4 | 30 | Example X | 1,3,5,7-tetra-trifluoromethyl-10-(α-hydroxy-P-methylbenzyl)-2,6,9-trioxa-10-phosphatricyclo[3·3·1·1³,⁷]decane. |

TABLE II

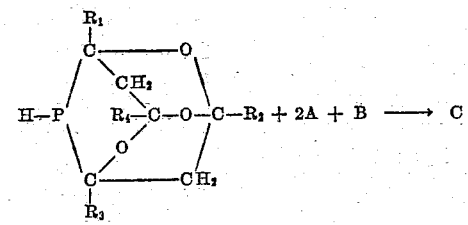

| Example | $R_1$ | $R_2$ | $R_3$ | $R_4$ | A | B | Solvent | Time (Hours) | Temp. °C. | C |
|---|---|---|---|---|---|---|---|---|---|---|
| XXIX | $CH_3$ | $CH_3$ | $CH_3$ | $CH_3$ | acetaldehyde | HBr | ethanol | 5 | 30 | 1,3,5,7 - tetramethyl - 10,10 - bis (1 - hydroxyethyl) - 2,6,9 - trioxa - 10 - phosphoniatricyclo[3·3·1·1³,⁷]decane bromide. |
| XXX | $CF_3$ | $CF_3$ | $CF_3$ | $CF_3$ | butyraldehyde | $HNO_3$ | methanol | 16 | 62 | 1,3,5,7-tetra-trifluoromethyl- 10,10- bis (1 - hydroxybutyl) - 2,6,9 - trioxa -10- phosphoniatricyclo[3·3·1·1³,⁷]decane nitrate. |
| XXXI | $C_4H_9$ | $C_4H_9$ | $C_4H_9$ | $C_4H_9$ | propionaldehyde. | $H_2SO_4$ | isopropanol | 10 | 80 | 1,3,5,7 - tetrabutyl - 10,10 - bis(1 - hydroxypropyl) -2,6,9 - trioxa -10-phosphoniatricyclo [3·3·1·1³,⁷] decane hydrogensulfate. |

TABLE III

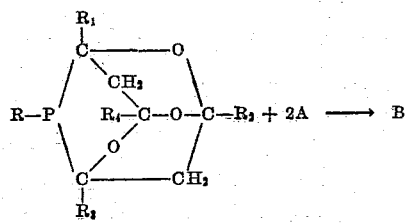

| Example | $R_1$ | $R_2$ | $R_3$ | $R_4$ | R | A | Solvent | Time (Hours) | Temp. °C. | B |
|---|---|---|---|---|---|---|---|---|---|---|
| XXXII | $CF_3$ | $CF_3$ | $CF_3$ | $CF_3$ | H | ethyl bromide | methanol | 4 | 60 | 1,3,5,7 - tetra - trifluoromethyl - 10,10 - diethyl -2,6,9 - trioxa -10- phosphoniatricyclo [3·3·1·1³,⁷] decane bromide. |
| XXXIII | $C_4H_9$ | $C_4H_9$ | $C_4H_9$ | $C_4H_9$ | H | methyl chloride | ethanol | 6 | 40 | 1,3,5,7 - tetrabutyl - 10,10 - dimethyl - 2,6,9 - trioxa - 10- phosphoniatricyclo [3·3·1·1³,⁷] decane chloride. |
| XXXIV | $CH_3$ | $CH_3$ | $CH_3$ | $CH_3$ | $C_6H_5$ | propyl bromide | isopropanol | 8 | 60 | 1,3,5,7 - tetramethyl - 10 - propyl - 10-phenyl-2,6,9-trioxa-10-phosphoniatricyclo [3·3·1·1³,⁷] decane bromide. |
| XXXV | $CF_3$ | $CF_3$ | $CF_3$ | $CF_3$ | $nC_8H_{17}$ | butyl chloride | methanol | 6 | 50 | 1,3,5,7-tetra- trifluoromethyl-10-butyl-10-octyl - 2,6,9-trioxa -10-phosphoniatricyclo [3·3·1·1³,⁷] decane chloride. |

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. A substituted 1,3,5,7-tetraalkyl-2,6,9-trioxa-10-phosphatricyclo[3·3·1·1³,⁷]decane of the formula

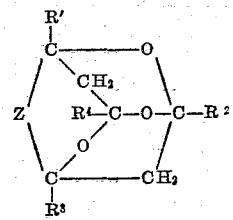

wherein R', R², R³ and R⁴ each represent a member selected from the group consisting of $CF_3$ and lower alkyl; and Z is a member selected from the group consisting of:

in which Q is a member selected from the group consisting of O and S and Ra is a member selected from the group consisting of H, an alkali metal, ammonium, an alkaline earth metal, and a heavy metal;

wherein Q is a member selected from the group consisting of O and S, and Rb is a member selected from the group consisting of halogen, hydrogen and the residue of a primary phosphine;

wherein Rc is a member selected from the group consisting of

and substituted carbamoyl,

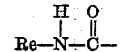

Rd being a member selected from the group consisting of phenyl, halo-substituted phenyl and lower alkyl-substituted phenyl and Re is selected from the group consisting of lower alkyl, substituted alkyl, phenyl, substituted phenyl, said substituent on the lower alkyl moiety being

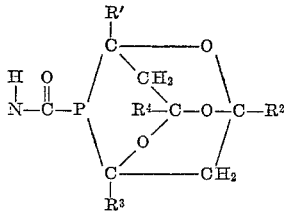

R'—R⁴ having the meanings given above, and said substituents for the phenyl moiety being selected from the group consisting of halo-, nitro-, lower alkyl and

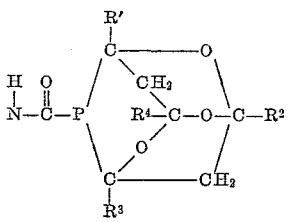

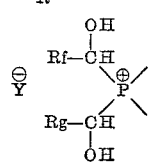

wherein Rf and Rg each represent a member selected from the group consisting of H and lower alkyl, and Y is the anion of a mineral acid; and

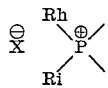

wherein Rh and Ri each represent lower alkyl, and X is halo-.

2. 1,3,5,7-tetramethyl - 2,6,9-trioxa-10-phosphatricyclo-[3·3·1·1³,⁷]decane-10-inoic acid.

3. 1,3,5,7,10,10-hexamethyl-2,6-9 - trioxa-10-phosphoniatricyclo[3·3·1·1³,⁷]decane iodide.

4. 1,3,5,7 - tetramethyl - 10,10-dihydroxymethyl-2,6,9-trioxa - 10 - phosphoniatricyclo[3·3·1·1³,⁷]decane chloride.

5. 1,3,5,7-tetramethyl - 10 - phenylcarbamoyl-2,6,9-trioxa-10-phosphatricyclo[3·3·1·1³,⁷]decane.

6. N,N' - (4-methyl-m-phenylene) - bis(1,3,5,7 - tetramethyl-10-carboxamide-2,6,9-trioxa - 10-phosphatricyclo-[3·3·1·1³,⁷]decane).

7. 1,3,5,7-tetramethyl - 2,6,9-trioxa-10-phosphatricyclo-[3·3·1·1³,⁷]decane-10-dithioinoic acid, ammonium salt.

8. 1,3,5,7 - tetramethyl - 10 - isobutyl - 2,6,9-trioxa-10-phosphatricyclo[3·3·1·1³,⁷]decane-10-oxide.

9. 1,3,5,7,10-pentamethyl - 10 - isobutyl 2,6,9-trioxa-10-phosphoniatricyclo[3·3·1·1³,⁷]decane iodide.

10. 1,3,5,7-tetramethyl - 10 - α-hydroxybenzyl-2,6,9-trioxa-10-phosphatricyclo[3·3·1·1³,⁷]decane.

11. 1,3,5,7-tetramethyl - 2,6,9 - trioxa-10-phosphatricyclo-[3·3·1·1³,⁷]decane-10-oxide.

No references cited.

UNITED STATES PATENT OFFICE
CERTIFICATE OF CORRECTION

Patent No. 3,026,327            March 20, 1962

Martin Epstein et al.

It is hereby certified that error appears in the above numbered patent requiring correction and that the said Letters Patent should read as corrected below.

Column 1, lines 25 to 33, the formula should appear as shown below instead of as in the patent:

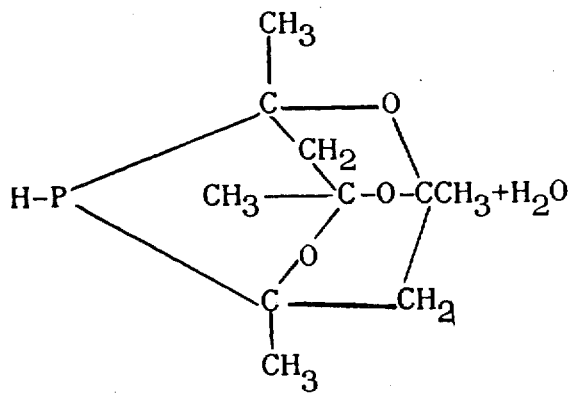

column 4, lines 61 to 64, for 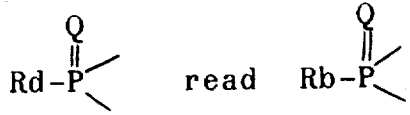 read 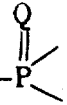

columns 9 and 10, TABLE I, "Example XXVI", under column B, line 12 thereof, for "[$3.3.1.^{3,7}$]" read -- [$3.3.1.1.^{3,7}$] --.

Signed and sealed this 7th day of August 1962.

(SEAL)
Attest:

ERNEST W. SWIDER            DAVID L. LADD

Attesting Officer            Commissioner of Patents